United States Patent
Wei et al.

(10) Patent No.: US 10,340,094 B2
(45) Date of Patent: Jul. 2, 2019

(54) APPARATUS AND ASSOCIATED METHODS FOR ELECTRICAL STORAGE

(71) Applicant: Nokia Technologies Oy, Espoo (FI)

(72) Inventors: Di Wei, Cambridge (GB); Salvatore Zarra, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 110 days.

(21) Appl. No.: 15/572,947

(22) PCT Filed: Apr. 27, 2016

(86) PCT No.: PCT/FI2016/050270
§ 371 (c)(1),
(2) Date: Nov. 9, 2017

(87) PCT Pub. No.: WO2016/185082
PCT Pub. Date: Nov. 24, 2016

(65) Prior Publication Data
US 2018/0102223 A1    Apr. 12, 2018

(30) Foreign Application Priority Data
May 18, 2015 (EP) .................... 15167921

(51) Int. Cl.
*H01M 6/18* (2006.01)
*H01G 11/28* (2013.01)
(Continued)

(52) U.S. Cl.
CPC ............. *H01G 11/28* (2013.01); *H01G 11/32* (2013.01); *H01G 11/54* (2013.01); *H01G 11/56* (2013.01);
(Continued)

(58) Field of Classification Search
CPC ............ H01M 6/14; H01M 6/22; H01M 6/32; H01M 6/40; H01M 10/36; H01M 2220/30;
(Continued)

(56) References Cited

U.S. PATENT DOCUMENTS 8,940,145 B1 *   1/2015   Chen ..................... C25D 13/02
                                                                204/490
9,673,452 B2 *   6/2017   Zhang ................... H01M 4/583
(Continued)

FOREIGN PATENT DOCUMENTS

EP        3 007 266 A1    4/2016
EP        3 016 179 A1    5/2016
(Continued)

*Primary Examiner* — Raymond Alejandro
(74) *Attorney, Agent, or Firm* — Harrington & Smith

(57) ABSTRACT

An apparatus including a first charge collector and an ionic layer, the ionic layer configured to absorb water from the surrounding environment to deliver said water to the apparatus, the apparatus including graphene oxide provided on the first charge collector, the graphene oxide configured to generate protons in the presence of water; a second conductive material spaced apart from the first charge collector, the second material having a lower work function than the first charge collector, the graphene oxide extending from the first charge collector to be in contact with the second material at an interface; wherein the ionic layer is in contact with the graphene oxide and the second material; and wherein the ionic layer includes a room temperature ionic fluid and a solidifying material which provides for the ionic layer to be a solid at room temperature.

15 Claims, 5 Drawing Sheets

(51) Int. Cl.
*H01G 11/32* (2013.01)
*H01G 11/54* (2013.01)
*H01M 10/36* (2010.01)
*H01M 6/14* (2006.01)
*H01M 6/22* (2006.01)
*H01M 6/32* (2006.01)
*H01M 6/40* (2006.01)
*H01G 11/56* (2013.01)

(52) U.S. Cl.
CPC .............. *H01M 6/14* (2013.01); *H01M 6/22* (2013.01); *H01M 6/32* (2013.01); *H01M 6/40* (2013.01); *H01M 10/36* (2013.01); *H01M 2220/30* (2013.01); *H01M 2300/0022* (2013.01); *H01M 2300/0085* (2013.01); *Y02E 60/13* (2013.01)

(58) Field of Classification Search
CPC .. H01M 2300/0022; H01M 2300/0085; H01G 11/28; H01G 11/32; H01G 11/54; H01G 11/56; Y02E 60/13
See application file for complete search history.

(56) References Cited

U.S. PATENT DOCUMENTS

| 2013/0182373 | A1  | 7/2013  | Yu et al. ........................ 361/502 |
| 2014/0113200 | A1* | 4/2014  | Seymour ................ H01G 11/38 429/231.8 |
| 2014/0211370 | A1* | 7/2014  | Seymour ................ H01G 11/36 361/504 |
| 2014/0315096 | A1  | 10/2014 | Borges et al. ................. 429/300 |

FOREIGN PATENT DOCUMENTS

| JP | 2017538245 A | 12/2017 |
| WO | WO 2014/188059 A1 | 11/2014 |

\* cited by examiner

APPARATUS AND ASSOCIATED METHODS FOR ELECTRICAL STORAGE

TECHNICAL FIELD

The present disclosure relates to the field of electrical storage (including, for example, batteries, supercapacitors and battery-capacitor hybrids), associated methods and apparatuses, and in particular concerns an apparatus comprising graphene oxide configured to generate protons in the presence of water, the graphene oxide provided on a first charge collector, and an ionic layer, provided on the graphene oxide, which is solid at room temperature and is configured to absorb water from the surrounding environment and deliver said water to the apparatus/graphene oxide. Such apparatuses can be considered in certain embodiments to be or relate to proton batteries. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. webbrowsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop smaller electrical storage cells having a greater storage capacity than existing storage cells for use in modern electronic devices.

One or more aspects/embodiments of the present disclosure may or may not address this issue.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising an ionic layer, the ionic layer configured to absorb water from the surrounding environment to deliver said water to the apparatus, the apparatus comprising:
  graphene oxide provided on a first charge collector, the graphene oxide configured to generate protons in the presence of water,
  a second conductive material spaced apart from the first charge collector, the second material having a lower work function than the first charge collector, the graphene oxide extending from the first charge collector to be in contact with the second material at an interface, the ionic layer in contact with the graphene oxide and the second material, and
  wherein the ionic layer comprises a room temperature ionic fluid and a solidifying material which provides for the ionic layer to be a solid at room temperature.

The second material may be provided on a second charge collector, the second charge collector being physically and electrically spaced apart from the first charge collector and the second conductive material extending from the second charge collector to the junction.

The room temperature ionic fluid may be a liquid at room temperature. Room temperature may be considered to be one or more of the following temperature ranges: −100° C. to +100° C.; −50° C. to +50° C.; +15° C. to +35° C.; and +20° C. to +27° C.

The room temperature ionic fluid may comprise of one or more of triethylsulfonium bis(trifluoromethane)sulfonimide (TES-TFSI), 1-ethyl-3-methylimidazolium bis(trifluoromethane)sulfonimide (EMI M-TFSI) and trioctylmethylammonium bis(trifluoromethane)sulfonimide (OMA-TFSI). The room temperature ionic fluid may comprise another compound containing bis(trifluoromethane)sulfonimide (TFSI). Alternatively, the room temperature ionic fluid may comprise a compound not containing TFSI.

The solidifying material may comprise a covalent polymeric network. This may also be considered as a polymer matrix. The covalent polymeric network may have a degree of polymerisation above 50%, above 60%, above 70%, above 80%, above 90%, or substantially 100%.

The room temperature ionic fluid may be one or more of immobilised, embedded, contained or held in the covalent polymeric network.

The graphene oxide may be coated on the first charge collector. The second material may be coated on the second charge collector. The ionic layer may be coated on the graphene oxide and second material.

The second material may comprise one or more of reduced graphene oxide, potassium hydroxide, poly(3,4-ethylenedioxythiophene) polystyrene sulfonate, a base and a conducting polymer.

The graphene oxide, provided on the first charge collector, may be provided as a mixture of graphene oxide and a proton conductor. The proton conductor may be hydrophobic, and may comprise one or more of an organic polymer, an ionomer and Nafion™.

One or both of the first and second charge collectors may comprise at least one of a metal, an alloy, gold, silver, copper, aluminium, steel, and indium tin oxide.

The apparatus may comprise a substrate configured to support the first and second charge collectors, the graphene oxide, second material and ionic layer. The substrate may be at least one of insulating, flexible and hydrophilic.

The ionic layer which is solid at room temperature may have one or more of the following properties: a pencil gauge hardness above 2B at room temperature, and a glass transition temperature above 50° C. Other properties which provide for the ionic layer to be solid may be envisaged.

The first and second charge collectors may be spaced apart by a distance of less than one or more of 2 mm, 1 mm, 500 μm, 100 μm and 50 μm.

The width of the interface between the graphene oxide and the second material may be less than one or more of 500 μm, 100 μm, 50 μm, 10 μm and 1 μm.

The apparatus may be configured to allow one or more of the ionic layer and the graphene oxide to be exposed to water (e.g. water vapour) in the surrounding environment. In operation, water (e.g. liquid water, water vapour) may be specifically provided to the apparatus and/or the apparatus may comprise a water source. Alternatively, water may not be specifically provided to the apparatus. For example, the ionic layer/graphene oxide may be exposed to water in the form of air humidity.

The ionic layer may be configured to facilitate the generation of protons by the graphene oxide by acting to deliver water to the apparatus/graphene oxide/second material from the surrounding environment. Additionally, the ionic layer may be configured to facilitate the flow of charge between the first and second charge collectors by increasing the ionic conductivity of the apparatus (e.g. by increasing the ionic conductivity of the graphene oxide). Additionally, the ionic layer may be configured to increase the output/open circuit voltage of the apparatus by decreasing the work function of the second material The ionic layer may further comprise one or more salts configured to enhance the absorption of water by the ionic layer from the surrounding environment and/or the delivery of water to the apparatus/graphene oxide/second material. The one or more salts may comprise at least one of lithium bis(trifluoromethylsulfonyl)imide, lithium chloride and sodium chloride.

The room-temperature ionic fluid may be hydrophilic.

The apparatus may be one or more of a battery, a capacitor, a supercapacitor, a battery-capacitor hybrid, an electronic device, a portable electronic device, a portable telecommunications device, a mobile phone, a personal digital assistant, a mobile phone, a smartphone, a phablet, a tablet, a laptop computer, an electronic watch, a wireless sensor, an electrochemical sensor, a wearable device, an RFID tag, an electrochromic device, a humidity sensor and a module for one or more of the same.

According to a further aspect, there is provided an apparatus comprising two or more of the previously described apparatuses arranged in a stack.

According to a further aspect, there is provided a method of making an apparatus, comprising:
  providing graphene oxide on a first charge collector, the graphene oxide configured to generate protons in the presence of water,
  providing a second conductive material spaced apart from the first charge collector, the second material having a lower work function than the first charge collector,
  the graphene oxide provided so as to extend from the first charge collector to be in contact with the second material at an interface; and
  providing an ionic layer in contact with the graphene oxide and the second material, the ionic layer configured to absorb water from the surrounding environment to deliver said water to the apparatus, wherein the ionic layer comprises a room temperature ionic fluid and a solidifying material which provides for the ionic layer to be a solid at room temperature.

The second material may be provided on a second charge collector, the second charge collector being physically and electrically spaced apart from the first charge collector and the second conductive material extending from the second charge collector to the junction.

The ionic layer may be provided by polymerising/polymerisation of a cross-linkable oligomer in the present of the room temperature ionic fluid to form a covalent polymeric network containing the room-temperature ionic fluid. The polymerising/polymerisation may be performed in-situ or ex-situ.

Polymerisation may comprise UV irradiation of the room temperature ionic fluid, the cross-linkable oligomer and a UV cross-linking initiator material.

The cross-linkable oligomer may comprise homobifunctional poly(ethyleneglycol) (PEG) derivatives such as poly(ethyleneglycol) diacrylate (PEG-DA), poly(ethyleneglycol) dimethacrylate (PEG-DMA) or poly(ethyleneglycol) divinyl ether (PEG-DE) of varying molecular weights. The cross-linking initiator may comprise any appropriate compound including but not limited to phenones such as 2-hydroxy-2-methylpropiophenone (HOMPP), benzophenone (BP), 4-(dimethylamino) benzophenone (DMBP) or any other suitable initiator.

The weight ratio between the room temperature ionic fluid, the cross-linkable oligomer and the UV cross-linking initiator may be one of: 85:10:5, 80:15:5 or 75:20:5.

The UV irradiation may be performed for a time in a range of: from 1 second to 45 seconds, from 45 seconds to 90 seconds, from 90 seconds to 5 minutes, or for over 5 minutes.

A UV photomask may be used during UV irradiation of the room temperature ionic fluid, the cross-linkable oligomer and the UV cross-linking initiator material. The photomask may be used to define the pattern of the cross-linked regions.

One or more of the above components may be provided on a substrate. The substrate may form part of the apparatus. Alternatively, the substrate may not form part of the apparatus and may be removed during or after manufacture of the apparatus. The substrate may be one or more of insulating, flexible and hydrophilic. The substrate may be polyethylene naphthalate (PEN).

The graphene oxide may be coated on the first charge collector. The second material may be coated on the second charge collector. The ionic layer may be coated in contact with the graphene oxide and second material.

One or more of the first charge conductor, the second charge conductor, the graphene oxide, the second material and the ionic layer may be provided by a printing process, e.g. roll-to-roll printing or inkjet printing. Alternatively, one or more of the components may be provided by dropcasting. The second material may be provided/deposited as an aqueous solution.

In a further aspect (comprising a second charge collector), there is provided an apparatus comprising spaced apart first and second charge collectors, and an ionic layer, the ionic layer configured to absorb water from the surrounding environment to deliver said water to the apparatus, the apparatus comprising:
  graphene oxide provided on the first charge collector, the graphene oxide configured to generate protons in the presence of water;
  a second conductive material provided on the second charge collector, the second material having a lower work function than the first charge collector, the graphene oxide and the second material extending from their respective charge collectors to be in contact at an interface;
  the ionic layer in contact with the graphene oxide and the second material; and
  wherein the ionic layer comprises a room temperature ionic fluid and a solidifying material which provides for the ionic layer to be a solid at room temperature.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings.

DESCRIPTION OF SPECIFIC ASPECTS/EMBODIMENTS

Electrical energy storage is an important consideration for portable electronic devices. Proton batteries are currently being developed for this purpose. The energy generation mechanism of one type of proton battery involves the degradation of graphene oxide when in contact with water. The water may be contained within the battery or it may come from the surrounding environment (e.g. in the form of air humidity).

Figure 1A:
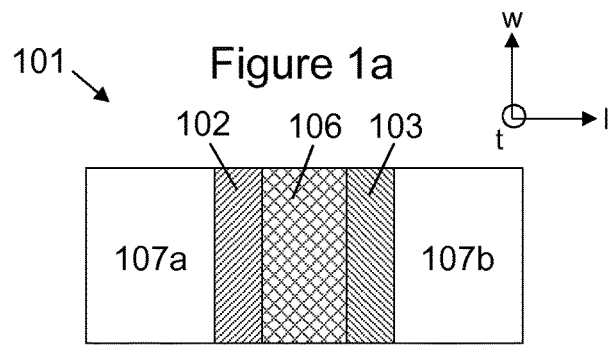
FIG. 1a illustrates schematically an existing proton battery in plan view.
Figure 1B:
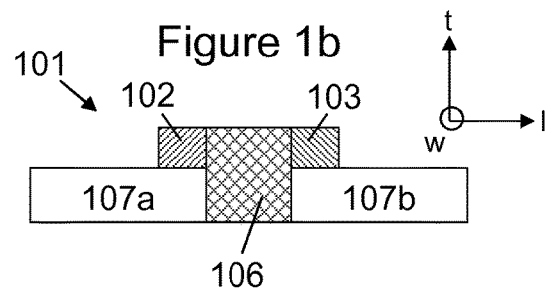
FIG. 1b illustrates schematically the proton battery of FIG. 1a in cross-section.

FIGS. 1a and 1b show an existing graphene oxide-based proton battery 101 in plan view and cross-section, respectively. The battery comprises a first electrode 102, 107a formed from graphene oxide 102 and a second electrode 103, 107b formed from reduced graphene oxide 103. The first and second electrodes are deposited such that they (at least partly) overlie respective silver charge collectors 107a, 107b and form a junction with one another at an interface 106 therebetween (e.g. where the electrode materials intermix and/or overlie one another). Depending on how the mechanism is understood, the first charge collector 107a, given that it is conductive, could be considered to be the first electrode, although one or more of the graphene oxide and the first charge collector could also be considered to be the first electrode (even though the graphene oxide is not conductive).

There will now be described an apparatus and associated methods that may be able to provide a greater electrical output and/or electric storage capacity than the existing proton battery 101.

Figure 2:
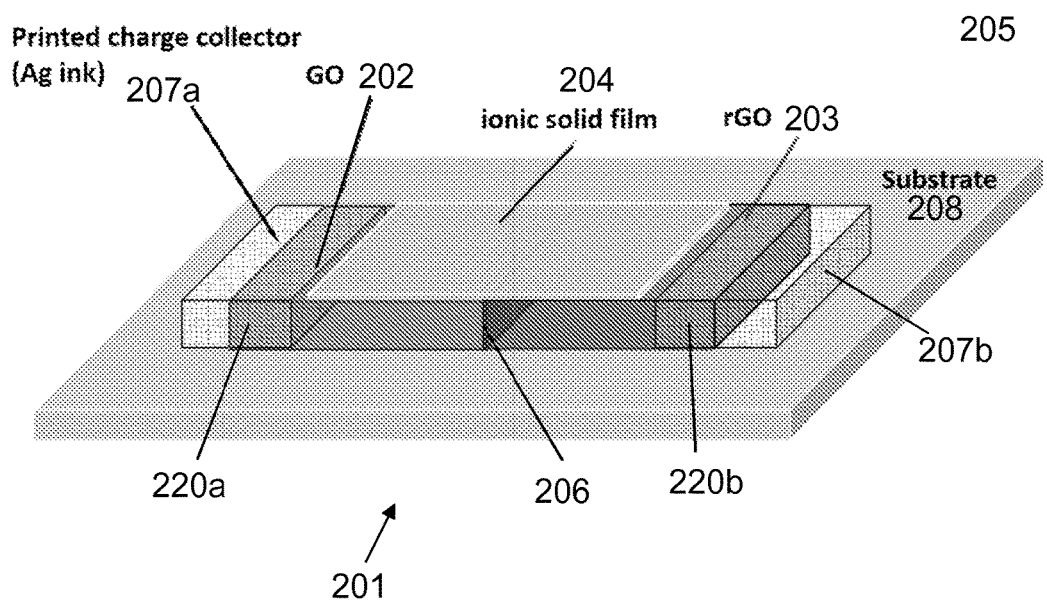
FIG. 2 illustrates schematically one example of an apparatus according to the present disclosure.

FIG. 2 shows one embodiment of the present apparatus 201, which may be one or more of a primary or secondary battery, a capacitor, a supercapacitor, a battery-capacitor hybrid, and a module for one or more of the same depending on the specific electrochemistry of the apparatus. The apparatus 201 comprises physically and electrically spaced apart first 207a and second 207b charge collectors, with graphene oxide 202 provided on the first charge collector 207a and a second material 203 provided on the second charge collector 207b, such that the graphene oxide 202 and second material 203 meet at an interface 206. An ionic layer 204 is provided in contact with both the graphene oxide 202 and the second material 203. The ionic layer may be in contact with one of, but not both, the first charge collector 207a and the second charge collector 207b (to prevent short-circuiting). In this particular case, the second material 203 is reduced graphene oxide and the first 207a and second 207b charge collectors are both silver.

It will be appreciated that provision of graphene oxide 202 "on" a first charge collector 207a and a second material 203 "on" a second charge collector 207b encompasses provision of graphene oxide 202/second material 203 in functional contact with the respective charge collector 207a, 207b, whether above, below or by the lateral side of the respective charge collector 207a, 207b. In the embodiment of FIG. 2, the graphene oxide 202 and second material 203 are provided by the lateral side of the respective charge collector 207a, 207b, and this may be described as "on" the respective charge collector 207a, 207b.

In this embodiment (and subsequently described embodiments), the apparatus is described as comprising a second charge collector 207b, the second material 203 provided on the second charge collector 207b. The second charge collector 207b may provide a physically robust contact point, and allow electrons to flow from the second material 203 to an external circuit when the first 207a and second 207b charge collectors are connected to an external circuit. However, it will be understood that future technological developments may allow for the second material 203 to be efficiently connected directly to an external circuit, without the need for a second charge collector 207b. In this scenario, the present disclosure should be understood to include such apparatuses (and corresponding methods) without a second charge collector 207b, per se.

Importantly, the ionic layer 204 comprises a room temperature ionic fluid (not shown) and a solidifying material (not shown) which provides for the ionic layer 204 to be solid at room temperature. The room temperature solid ionic layer 204 is configured to absorb water from the surrounding environment and deliver said water to the apparatus 201/graphene oxide 202/second material 203. The room temperature ionic fluid may be a liquid at room temperature (e.g. +20° C. to +27° C., −50° C. to +50° C.).

The graphene oxide 202 is configured to generate protons in the presence of water. This may produce a potential difference between the first charge collector 207a and second material 203. Additionally, the work function of the second material 203 is lower than the work function of the first charge collector 207a. Hence when the first 207a and second 207b charge collectors are connected by an external circuit (not shown), electrons may flow from the first charge collector 207a (left hand side in FIG. 2) to the second charge collector 207b (right hand side in FIG. 2) through the apparatus, and from the second charge collector 207b to the first charge collector 207a through the external circuit. This electron flow may be due to the differences in work functions (i.e. electrons may flow from the higher work function material (first charge collector 207a) to the lower work function material (second material 203) through the graphene oxide 202) and the generated/produced potential difference between the first charge collector 207a and the second material 203. Additionally, when the first 207a and second 207b charge collectors are connected by an external circuit, protons may flow from the graphene oxide 202 to the first charge collector 207a. The first charge collector 207a (e.g. silver), and/or the graphene oxide 202 (although this is non-conductive) may be considered to act as a first electrode. The second material 203 (e.g. reduced graphene oxide) may be considered to act as a second electrode.

It may be advantageous for the work function of the graphene oxide 202 to be higher than the work function of the second material 203 and/or lower than the work function of the first charge collector 207a. It may be advantageous for the work function of the second charge collector 207b to be lower than the work function of the second material 203.

The graphene oxide 202 may be considered to have a significant proton conductivity and negligible electron conductivity. The second material 203 may be considered to have a significant electron conductivity (hence "conductive second material") and a poor proton conductivity. The graphene oxide 202 may be conductive to electrostatic charge at high humidity (e.g. above 50% humidity). This may further increase the electron flow between the first 207a and second 207b charge collectors.

The solid ionic layer 204 feature has been found to boost both the storage capacity and output voltage of the apparatus 201, and allows the apparatus 201 to be discharged at higher currents. The solid ionic layer 204 may facilitate the generation of protons in the graphene oxide 202 by delivering water from the surrounding environment to the apparatus 201/graphene oxide 202/second material 203. Additionally, the ionic layer 204 may facilitate the flow of charge between the first 207a and second 207b charge collectors by increasing the ionic conductivity of the apparatus 201 (e.g. by increasing the ionic conductivity of the graphene oxide 202). Additionally, the ionic layer 204 may be considered to increase the output/open circuit voltage of the apparatus 201 by decreasing the work function of the second material 203.

In some embodiments (e.g. secondary battery, capacitor, supercapacitor or battery-capacitor hybrid) the presence of the ionic layer enables the apparatus 201 to be recharged within a few minutes after being fully discharged without the application of external energy. This is due to the chemical reactions between the graphene oxide 202 and the water from the external environment 205 which generate protons and give rise to the potential difference. In these embodiments, the apparatus 201 may therefore be recharged provided that (i) there is water present, and (ii) the graphene oxide 202 has not been completely consumed during the previous charge cycles. In other embodiments (e.g. primary batteries), however, the apparatus 201 may not be rechargeable.

The apparatus 201 may be considered to be a fully solid state apparatus, which provides numerous advantages. By virtue of its room temperature solid nature, the apparatus 201 may be stackable, flexible, touchable, moveable and positioned in any orientation. Additionally, the presence of the solid ionic layer 204 on the graphene oxide 202 and second material 203 may prevent portions of the graphene oxide 202 and the second material 204 from flaking off the apparatus 201, for example when the apparatus 201 is flexed, thus improving the integrity of the apparatus. The apparatus 201 may be inexpensive and simple to manufacture, and it be may be manufactured commercially on a large scale, for example using printing methods.

The solidifying material may advantageously comprise a covalent polymeric network (this may also be considered as a polymer matrix). The covalent polymeric network may have a degree of polymerisation above 50%, above 60%, above 70%, above 80%, above 90%, or substantially 100%, depending on the particular embodiment used in a particular application.

The room temperature ionic fluid may be considered to be one or more of immobilised, embedded, contained or held in the covalent polymeric network. This may be due to the method of manufacture of the ionic layer 204, for example in-situ polymerisation of cross-linkable oligomers in the presence of the room temperature ionic fluid.

In the embodiment shown in FIG. 2, the graphene oxide 202 and the second material 203 are configured to form a junction with one another at an interface therebetween 206 (e.g. where the materials intermix and/or overlie one another) and the ionic layer 204 is in contact with the junction 206 of the graphene oxide 202 and the second material 203. This configuration can be produced using a relatively simple printing process.

In one embodiment, the graphene oxide 202 is provided as a mixture of graphene oxide and a proton conductor. The proton conductor may be hydrophobic, and may comprise one or more of an organic polymer, an ionomer and Nafion™. The second material may be deposited/provided as an aqueous solution. The provision of a hydrophobic proton conductor may allow a smaller graphene oxide 202/second material 203 interface region 206 to be produced during manufacture of the apparatus 201, as the hydrophobic proton conductor in the graphene oxide mixture may "repel" an aqueous second material 202, limiting the amount of overlap and/or intermixing of the two materials. Additionally or alternatively, the hydrophobic proton conductor may push water molecules present in the graphene oxide mixture towards the graphene oxide 202, further facilitating the generation of protons. Alternatively, the graphene oxide 202 may be provided alone or in another mixture or composition.

FIG. 2 also shows regions of overlap 220a, 220b between the first charge collector 207a and the graphene oxide 202 and the second charge collector 207b and the second material 203 respectively. Such regions 220a, 220b may be produced, for example, if the graphene oxide 202 and/or second material 203 and/or charge collector 207a 207b materials are deposited using a printing process. Such embodiments encompass the graphene oxide 202/second material 203 being provided "on" the respective charge collector 207a, 207b.

The apparatus 201 may be configured to allow one or both of the ionic layer 204 and the graphene oxide 202 to be exposed to water in the surrounding environment. In practice, this could be achieved, for example, by leaving the apparatus 201 uncovered/unsealed, containing the apparatus 201 within a water and/or air-permeable material if a casing is required, or by providing a casing for the apparatus 201 with one or more portions which are configured to be opened and closed. The ability to expose the ionic layer 204 to water in the surrounding environment 205 is necessary in order to benefit from the enhanced electrical properties of the present apparatus 201, because the water can be considered to fuel the generation of protons in the graphene oxide 202 and the ionic layer 204 may facilitate the provision of water to the graphene oxide 202. In some cases, the apparatus 201 may also comprise a water source so that protons (and therefore a potential difference) can be produced even when the humidity of the surrounding environment 205 is relatively low. For example, the apparatus 201 may comprise a water-absorbing material (such as sponge) in fluid-communication with the ionic layer 204 and/or graphene oxide 202. Alternatively or additionally, the substrate 208, upon which the charge collectors 207a, 207b and/or the graphene oxide 202/second material 203 are provided, may be hydrophilic.

In this embodiment, the ionic layer 204 is configured to deliver water to the apparatus 201/graphene oxide 202/second material 203. In other embodiments, the ionic layer 204 may be configured to not deliver water to the second material 203 and/or to deliver water to the graphene oxide 202 only.

Suitable examples of a room temperature ionic fluid include triethylsulfonium bis(trifluoromethylsulfonyl)imide (TES-TFSI), 1-ethyl-3-methylimidazolium bis(trifluoromethane)sulfonimide (EMI M-TFSI) and trioctylmethylammonium bis(trifluoromethylsulfonyl)imide (OMA-TFSI). Other compounds, such as other compounds including TFSI, may be suitable.

One or both of the first 207a and second 207b charge collectors may comprise at least one of a metal, an alloy, gold, silver, copper, aluminium, steel, and indium tin oxide. The second material 203 may comprise at least one of reduced graphene oxide, potassium hydroxide, poly(3,4-ethylenedioxythiophene) polystyrene sulfonate (PEDOT:PSS), a base, and a conducting polymer. As mentioned above, the embodiment shown in FIG. 2 has charge collectors 207a, 207b which are silver and the second material 203 comprises reduced graphene oxide.

The apparatus 201 of FIG. 2 further comprises a substrate 208 configured to support the first 207a and second 207b charge collectors, graphene oxide 202, second material 203 and ionic layer 204. The supporting substrate 208 is particularly useful when the various components are formed using a printing process, because printable materials (e.g. inks, liquids and gels) may not be self-supporting, at least until they have been dried or cured. Alternatively, the apparatus 201 may not comprise a substrate 208. A substrate 208 may be used during the manufacture of the apparatus 201 but removed during or after manufacture. The substrate 208 may be one or more of insulating, flexible and hydrophilic. In the embodiment shown in FIG. 2, the substrate is polyethylene naphthalate (PEN).

The ionic layer 204 may further comprise one or more salts configured to enhance the absorption of water by the ionic layer 204 from the surrounding environment 205 and/or the delivery of water to the apparatus 201/graphene oxide 202/second material 203. The addition of the one or more salts may facilitate the generation of protons in the graphene oxide 202, thereby allowing even more electrical energy to be produced by the apparatus 201. Suitable salts include lithium bis(trifluoromethylsulfonyl)imide, lithium chloride and sodium chloride.

Various parameters or properties may be used to define the ionic layer 204 as solid. Suitable properties include a pencil gauge hardness above 2B at room temperature and/or a glass transition temperature above 50° C. Other properties which provide for the ionic layer 204 to be solid could be envisaged and are within the scope of the present disclosure.

The first 207a and second 207b charge collectors may be spaced apart by a distance of less than one or more of 2 mm, 1 mm, 500 um, 100 um and 50 um. The width of the interface 206 between the graphene oxide 202 and the second material 203 may be less than one or more of 500 um, 100 um, 50 um, 10 um and 1 um.

The apparatus 201 may be one or more of a battery, a capacitor, a supercapacitor, a battery-capacitor hybrid, an electronic device, a portable electronic device, a portable telecommunications device, a personal digital assistant, a mobile phone, a smartphone, a phablet, a tablet, a laptop computer, an electronic watch, a wireless sensor, an electrochemical sensor, a wearable device, an RFID tag, an electrochromic device, a humidity sensor and a module for one or more of the same.

According to a further aspect, there is provided an apparatus comprising two or more of the previously described apparatuses 201 arranged in a stack. As previously discussed, the fully solid state nature of the previously described apparatus 201 advantageously allows for stacking, and thus multiple batteries can be combined in one or more electrical serial and/or parallel configurations in a stacked physical arrangement.

The present apparatus 201 has been found to exhibit a larger storage capacity and output voltage than existing proton batteries 101, and can be discharged at higher currents. This can be attributed at least partly to the presence of the solid ionic layer 204. A number of experiments were performed to test the electrical properties of the apparatus 201.

Figure 3:
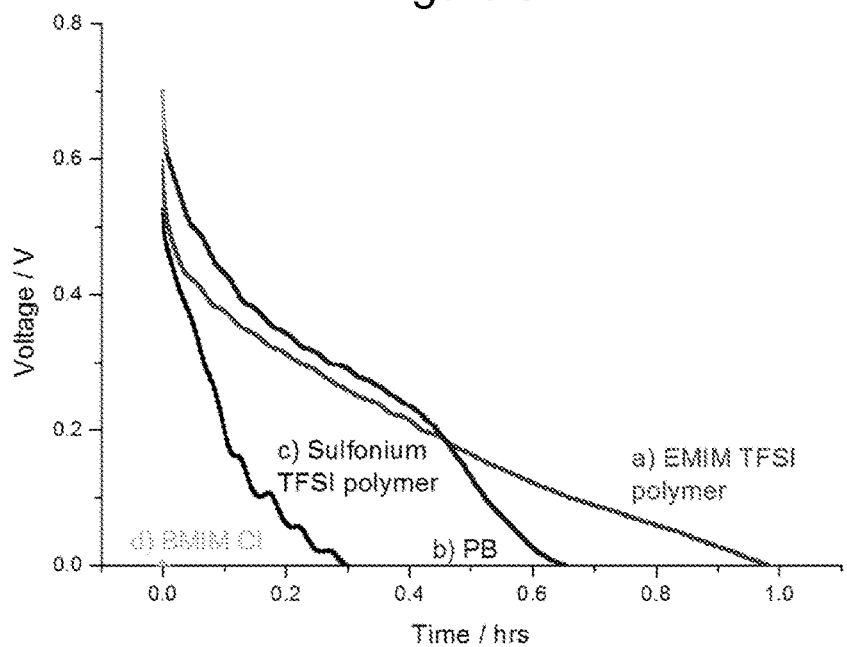
FIG. 3 illustrates discharge curves for several apparatuses of FIG. 2 having various different ionic layer compositions.

FIG. 3 shows discharge curves obtained from an experiment performed using four proton batteries. Three proton batteries (labelled a, c and d in FIG. 3) were embodiments of the apparatus 201 of FIG. 2, comprising a solid ionic layer 204. The fourth proton battery (labelled b) comprised a liquid ionic layer. Proton batteries a, c and d involved solid ionic layers 204 (solid ionic films) containing room temperature ionic fluids embedded in a covalent polymeric network, the room temperature ionic fluids being 1-ethyl-3-methylimidazolium bis(trifluoromethane)sulfonimide (EMIM-TFSI) (a), triethylsulfonium bis(trifluoromethane)sulfonimide (TES-TFSI) (c) and 1-butyl-3-methylimidazolium chloride (BMIM-CI) in mixture with cellulose (95/5 w/w) (d) respectively. Proton batteries a, c and d were made using the method described later in the present disclosure. Proton battery b was coated with liquid TES-TFSI (the same room temperature ionic fluid embedded in the ionic layer of proton battery c).

Throughout this experiment, reduced graphene oxide was used as the second material 203 and silver for the first 207a and second 207b charge collectors. The humidity of the surrounding environment 205 (i.e. the ambient humidity) was measured to be around 70% and the temperature of the surrounding environment was measured to be around 30'C.

Proton batteries a and b were found to perform comparably in the initial stages of discharge, with proton battery a giving a longer total discharge time (a: 1 hour, b: 0.65 hours). Proton battery b (liquid TES-TFSI coating) was found to perform better than proton battery c (TES-TFSI in solid ionic layer), with twice the discharge time (b: 0.65 hours, c: 0.3 hours) and a higher initial discharge voltage (0.7V, 0.53V) (though proton battery b does not provide the advantages of solid state proton batteries described above). Proton battery d (BMIM-CI) did not appear to give a measurable discharge. The TFSI containing room temperature ionic liquids were found to provide satisfactory discharge characteristics.

Figure 4A:
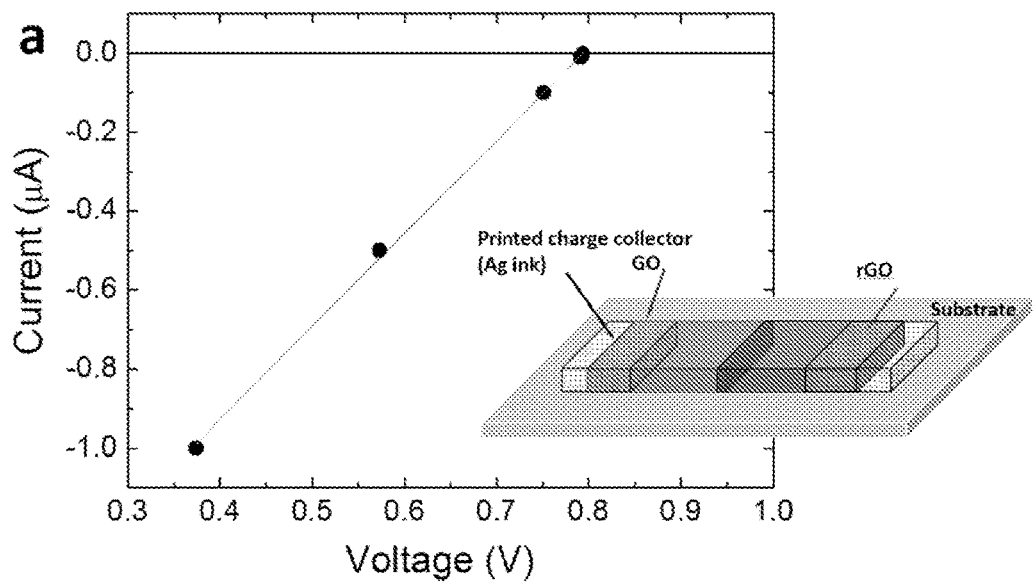
FIG. 4a illustrates current-voltage characteristics of the apparatus of FIG. 1.
Figure 4B:
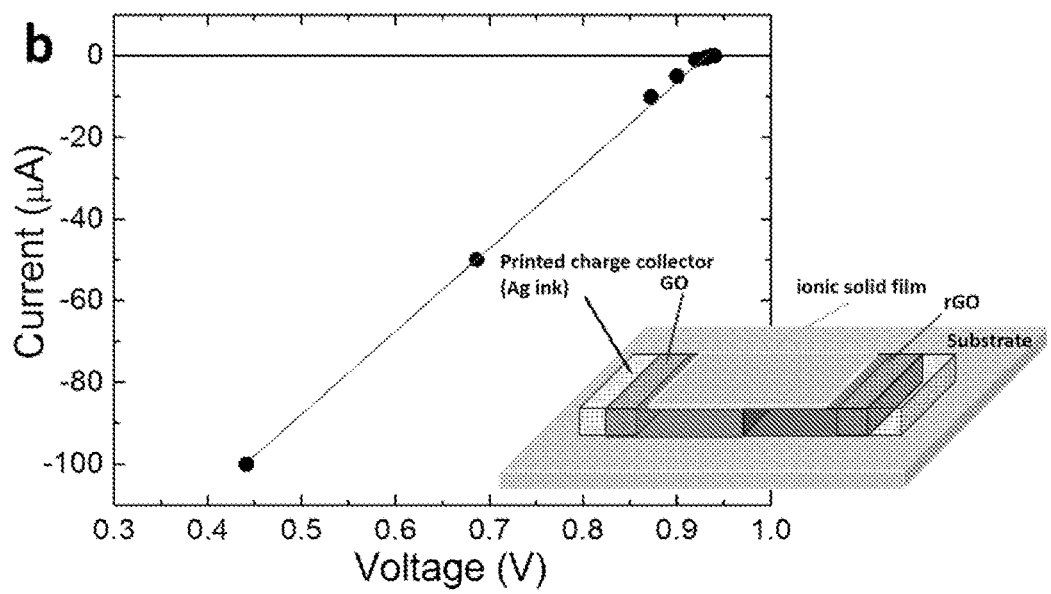
FIG. 4b illustrates current-voltage characteristics of the apparatus of FIG. 2.

FIGS. 4a and 4b show current (I)-voltage (V) characteristics for a first proton battery and a second proton battery respectively. The proton battery of FIG. 4a may be a proton battery 101 of the prior art as shown in FIG. 1, without a solid ionic layer 204. The proton battery of FIG. 4b is one embodiment of the apparatus 201 of FIG. 2, with a solid ionic layer 204 (ionic solid film). The solid ionic layer 204 contains EMIM-TFSI as the room temperature ionic fluid embedded in a covalent polymeric network, and so this apparatus may be considered to be similar to the 'a' apparatus of FIG. 3.

FIGS. 4a and 4b show that the discharge current, for these particular proton batteries, may be boosted by at least a factor of 100 by the presence of the solid ionic layer. FIGS. 4a and 4b also show that the open circuit voltage for these particular batteries increased from under 0.8V to nearly 0.95V. These increases may be due to the provision of water by the solid ionic layer 204 to the apparatus 201/graphene oxide 202/second material 203 facilitating the generation of protons in the graphene oxide 202, and/or an increase in ionic conductivity of the apparatus 201 due to the presence of the solid ionic layer and/or a decrease in the work function of the second material 203 due to the presence of the solid ionic layer 204.

Figure 5:
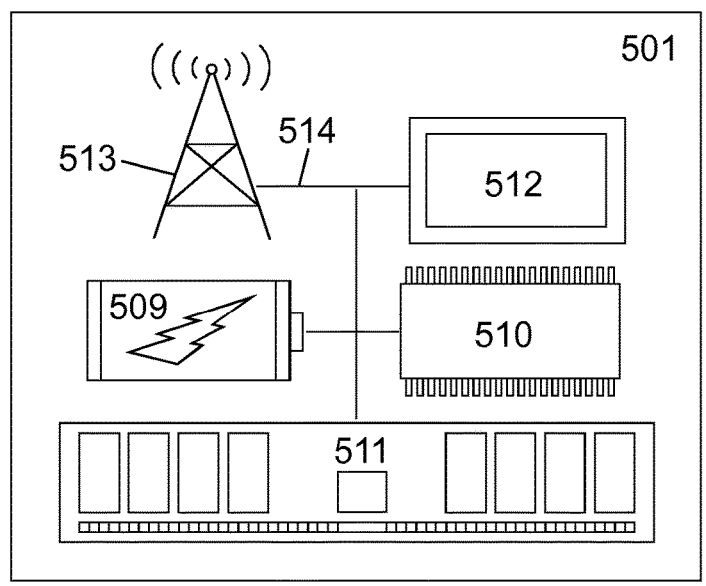
FIG. 5 illustrates schematically another example of an apparatus according to the present disclosure.

FIG. 5 shows another example of the present apparatus 501. In this example, the power source comprises some or all of the components described herein (shown in FIG. 5 as an electrical storage device 509). In addition, the apparatus comprises a processor 510, a storage medium 511, an electronic display 512 and a transceiver 513, which are electrically connected to one another by a data bus 514. The apparatus 501 may be one or more of an electronic device, a portable electronic device, a portable telecommunications device, a personal digital assistant, a mobile phone, a smartphone, a phablet, a tablet, a laptop computer, an electronic watch, a wireless sensor, an electrochemical sensor, a wearable device, an RFID tag, an electrochromic device, and a module for one or more of the same.

The electrical storage device/power source 509 is configured to provide electrical power (by virtue of the configuration as discussed in relation to FIG. 2) to the other components to enable their functionality. In this respect, the other components may be considered to be the external circuit referred to previously. The electronic display 512 is configured to display content stored on the apparatus 501 (e.g. stored on the storage medium 511), and the transceiver 513 is configured to transmit and/or receive data to/from one or more other devices via a wired or wireless connection.

The processor 510 is configured for general operation of the apparatus 501 by providing signalling to, and receiving signalling from, the other components to manage their operation. The storage medium 511 is configured to store computer code configured to perform, control or enable operation of the apparatus 501. The storage medium 511 may also be configured to store settings for the other components. The processor 510 may access the storage medium 511 to retrieve the component settings in order to manage the operation of the other components.

The processor 510 may be a microprocessor, including an Application Specific Integrated Circuit (ASIC). The storage medium 511 may be a temporary storage medium such as a volatile random access memory. On the other hand, the storage medium 511 may be a permanent storage medium such as a hard disk drive, a flash memory, or a non-volatile random access memory.

Figure 6:
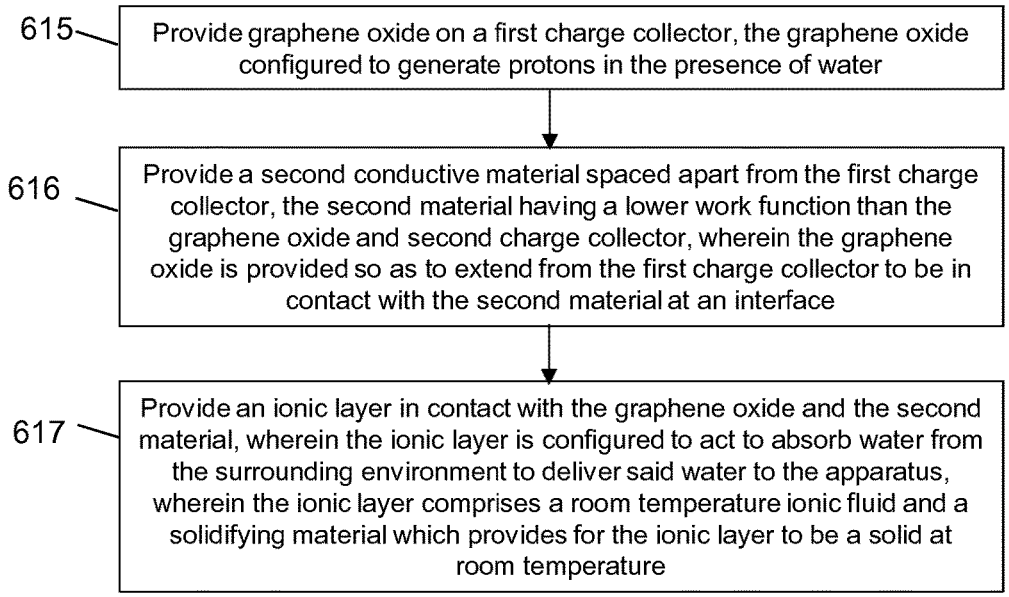
FIG. 6 illustrates schematically a method of making the apparatus of FIG. 2.

FIG. 6 shows the steps 615-617 of a method of making the apparatus described herein. The method generally comprises: providing 615 graphene oxide on a first charge collector, the graphene oxide configured to generate protons in the presence of water, providing 616 a second conductive material spaced apart from the first charge collector, the second material having a lower work function than the first charge collector, wherein the graphene oxide is provided so as to extend from the first charge collector to be in contact with the second material at an interface, and providing 617 an ionic layer in contact with the graphene oxide and the second material, wherein the ionic layer is configured to absorb water from the surrounding environment to deliver said water to the apparatus, wherein the ionic layer comprises a room temperature ionic fluid and a solidifying material which provides for the ionic layer to be a solid at room temperature. These steps do not necessarily have to be performed in the exact order disclosed, unless explicitly stated or understood by the skilled person. These steps may be performed using a variety of different fabrication processes.

The second material 203 may be provided on a second charge collector 207b.

The graphene oxide 202 may be coated on the first charge collector 207a. The second material 203 may be coated on the second charge collector 207b. The ionic layer 204 may be coated in contact with the graphene oxide 202 and second material 203. The first 207a and second 207b charge collectors may be coated on a substrate.

Advantageously, one or more of the graphene oxide 202, second material 203, the first 207a and second 207b charge collectors and the ionic layer 204 may be provided by a printing process, e.g. inkjet printing and/or roll-to-roll printing. This may provide an inexpensive, simple and scalable manufacture technique. In this scenario, care should be taken when printing the ionic layer 204 so that it is not in contact with both of the charge collectors 207a, 207b, otherwise it could short-circuit the apparatus 201. Alternatively or additionally, one or more of the components may be provided by dropcasting.

As mentioned above, the method of manufacture may use a covalent polymeric network as the solidifying material of the ionic layer 204. The room temperature ionic fluid may be considered to be one or more of immobilised, embedded, contained or held in the covalent polymeric network. The ionic layer 204, and the covalent polymeric network containing the room temperature ionic fluid thereof, may be formed by polymerisation of cross-linkable oligomer material in the presence of the room temperature ionic fluid. Alternatively, a polymeric network may be doped with the room temperature ionic fluid.

The polymerisation may be initiated by UV irradiation, though it will be understood that other polymerisation methods (e.g. thermal initiation, other types of electromagnetic irradiation) are within the scope of the present disclosure. In an embodiment involving UV irradiation, the mixture which is irradiated may contain the room temperature ionic fluid, a cross-linkable oligomer and a UV cross-linking initiator material.

The polymerisation may be performed in situ (e.g. the mixture may be dropcast onto the graphene oxide 202 and second material 203 before polymerisation) or ex situ (e.g. the polymerisation may occur before the ionic layer 204 is provided on the graphene oxide 202 and second material 203).

The mixture may be exposed to UV irradiation of wavelength 365 nm and intensity 225 mW/cm$^2$ for a time in a range of: from 1 second to 45 seconds, from 45 seconds to 90 seconds, from 90 seconds to 5 minutes, or for over 5 minutes. For UV irradiation of a different wavelength and/or different intensity, a different time range would be used to provide the necessary degree of polymerisation to provide for the solid ionic layer.

A UV photomask may be used during UV irradiation initiated polymerisation, and may be used to define the pattern of the cross-linked regions. After UV irradiation of the mixture whilst using a photomask, a solvent may be used to wash non-polymerised oligomers (and remnant room temperature ionic fluid and UV cross-linking initiator material) off the apparatus 201.

The weight ratio between the room temperature ionic fluid, the cross-linkable oligomer and the UV cross-linking initiator may be one of: 85:10:5, 80:15:5 or 75:20:5.

One or more of the above components may be provided on a substrate 208. The substrate 208 may form part of the apparatus 201. Alternatively, the substrate 208 may not form part of the apparatus 201 and may be removed after the one or more components have been provided upon it. The substrate 208 may advantageously be insulating and flexible, e.g. polyethylene naphthalate (PEN). The substrate may be hydrophilic.

The room temperature ionic fluid may be one or more of triethylsulfonium bis(trifluoromethane)sulfonimide (TES-TFSI), 1-ethyl-3-methylimidazolium bis(trifluoromethane)sulfonimide (EMI M-TFSI), trioctylmethylammonium bis(trifluoromethane)sulfonimide (OMA-TFSI) and another compound containing bis(trifluoromethane)sulfonimide (TFSI). The cross-linkable oligomer may comprise homo-bifunctional poly(ethyleneglycol) (PEG) derivatives such as poly(ethyleneglycol) diacrylate (PEG-DA), poly(ethyleneglycol) dimethacrylate (PEG-DMA) or poly(ethyleneglycol) divinyl ether (PEG-DE) of varying molecular weights. The cross-linking initiator may comprise any compound including by not limited to phenones such as 2-hydroxy-2-methylpropiophenone (HOMPP), benzophenone (BP), 4-(dimethylamino)benzophenone (DMBP) or any other suitable initiator. The second material 203 may comprise one or more of reduced graphene oxide, potassium hydroxide, poly(3,4-ethylenedioxythiophene) polystyrene sulfonate, a base and a conducting polymer. One or both of the first 207a and second 207b charge collectors may comprise at least one of a metal, an alloy, gold, silver, copper, aluminium, steel, and indium tin oxide. In one specific embodiment, the ionic layer comprises the room temperature ionic fluid EMIM-TFSI embedded in a covalent network of polymerised poly(ethyleneglycol) diacrylate (PEG-DA), the second material 203 comprises reduced graphene oxide and the first 207a and second 207b charge collectors comprise silver.

Alternatives to the above method can be envisaged and are within the scope of the present disclosure. Such alternatives include the use of different materials, different UV irradiation exposure times and different polymerisation methods.

One embodiment of the method of FIG. 6 was used to make proton batteries a, c and d of FIG. 3. First 207a and second 207b silver charge collectors were coated onto an insulating flexible polyethylene naphthalate (PEN) substrate 208. Graphene oxide 202 and reduced graphene oxide (as the second material 203) were coated on the first 207a and second 207b charge collectors respectively so as to form a junction at an interface 206 therebetween. The ionic layer 204 was provided by in-situ UV irradiation-initiated polymerisation of cross-linkable oligomers in the presence of the room temperature ionic fluid. A cross-linkable mixture (cross-linkable ink) was prepared by mixing 1.7 g of RTIL (various used, see below), 0.2 g of cross-linkable oligomer (poly(ethyleneglycol) diacrylate, PEG-DA, average $M_n$ 575) and 0.1 g of UV cross-linking initiator (2-hydroxy-2-methylpropiophenone, HOMPP). The mixture was stored at a low temperature and protected from light to avoid unwanted cross-linking occurring. The cross-linkable mixture was dropcast onto the graphene oxide 202 and reduced graphene oxide 203 of the apparatus 201, and the apparatus 201 was exposed to UV light (lamp having power intensity of 225 mW/cm$^2$ at wavelength 365 nm) for 1 minute. The work function of the second material 203 was measured at 4.2 eV, and the work function of the first charge collector 207a was measured at 4.9-5.0 eV.

Various room temperature ionic fluids were used in the solid ionic layers of proton batteries as described above, including triethylsulfonium bis(trifluoromethane)sulfonimide, 1-ethyl-3-methylimidazolium bis(trifluoromethane)sulfonimide (EMIM-TFSI) and 1-butyl-3-methylimidazolium (BMIM) thiocyanate. The ionic layers 204 containing TFSI ions were found to work well, as shown in FIG. 5.

Figure 7:
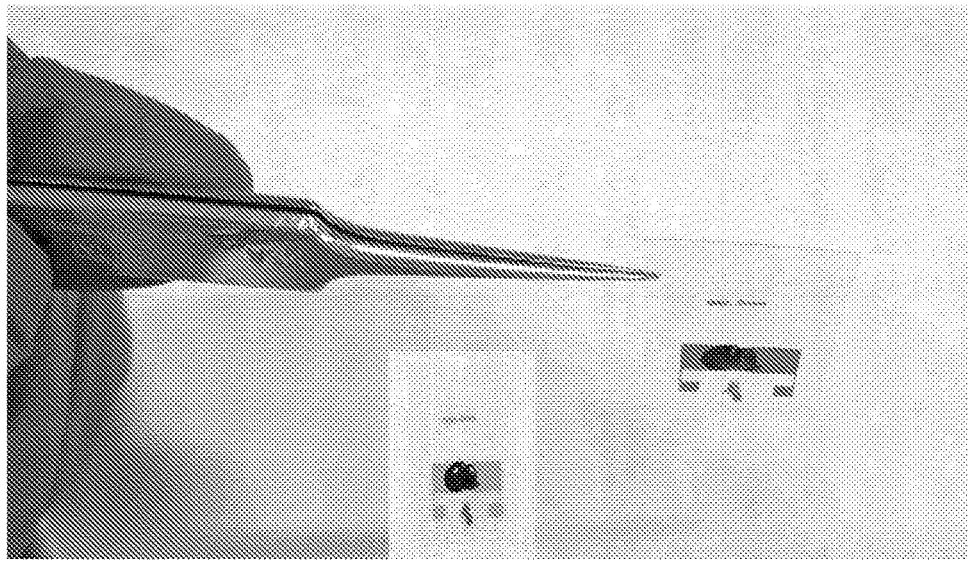
FIG. 7 illustrates an apparatus produced by the method of FIG. 6.

FIG. 7 shows an apparatus (a proton battery) produced by the method of FIG. 6. In accordance with this method, the proton battery is coated with a solid ionic layer. FIG. 7 shows that when the proton battery is titled at an angle, the solid ionic layer does not move relative to the rest of the proton battery. The solid nature of this ionic layer provides numerous advantages, as previously discussed.

Figure 8:
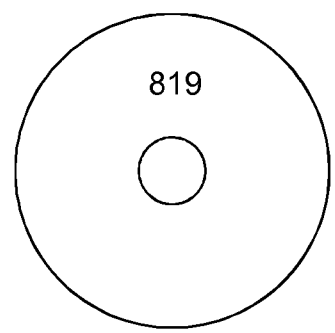
FIG. 8 shows a computer-readable medium comprising a computer program configured to perform, control or enable one or more of the method steps of FIG. 6.

FIG. 8 illustrates schematically a computer/processor readable medium 819 providing a computer program according to one embodiment. The computer program may comprise computer code configured to perform, control or enable one or more of the method steps 615-618 of FIG. 6. In this example, the computer/processor readable medium 819 is a disc such as a digital versatile disc (DVD) or a compact disc (CD). In other embodiments, the computer/processor readable medium 819 may be any medium that has been programmed in such a way as to carry out an inventive function. The computer/processor readable medium 819 may be a removable memory device such as a memory stick or memory card (SD, mini SD, micro SD or nano SD).

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/ processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a first charge collector and an ionic layer, the ionic layer configured to absorb water from the surrounding environment to deliver said water to the apparatus, the apparatus comprising:
   graphene oxide provided on the first charge collector, the graphene oxide configured to generate protons in the presence of water;
   a second conductive material spaced apart from the first charge collector, the second material having a lower work function than the first charge collector, the graphene oxide extending from the first charge collector to be in contact with the second material at an interface;
   wherein the ionic layer is in contact with the graphene oxide and the second material; and wherein the ionic layer comprises a room temperature ionic fluid and a solidifying material which provides for the ionic layer to be a solid at room temperature.

2. The apparatus of claim 1, wherein the room temperature ionic fluid is a liquid at room temperature.

3. The apparatus of claim 2, wherein the room temperature ionic fluid comprises one or more of:
   triethylsulfonium bis(trifluoromethane)sulfonimide (TES-TFSI);
   1-ethyl-3-methylimidazolium bis(trifluoromethane)sulfonimide (EMIM-TFSI);
   trioctylmethylammonium bis(trifluoromethane)sulfonimide (OMA-TFSI); and
   another bis(trifluoromethane)sulfonimide (TFSI) containing compound.

4. The apparatus of claim 1, wherein the solidifying material comprises a covalent polymeric network.

5. The apparatus of claim 1, wherein the ionic layer comprises a room temperature ionic fluid which is one or more of immobilised, embedded, contained or held in a covalent polymeric network.

6. The apparatus of claim 1, wherein the second material is provided on a second charge collector, the second charge collector spaced apart from the first charge collector, the second material extending from the second charge collector to the junction.

7. The apparatus of claim 1, wherein the second material comprises one or more of:
   reduced graphene oxide;
   potassium hydroxide;
   poly(3,4-ethylenedioxythiophene) polystyrene sulfonate;
   a base; and
   a conducting polymer.

8. The apparatus of claim 1, wherein the graphene oxide is provided as a mixture of graphene oxide and a proton conductor, wherein the proton conductor is hydrophobic.

9. The apparatus of claim 1, wherein the ionic layer has one or more of the following properties:
   a pencil gauge hardness above 2B at room temperature; and
   a glass transition temperature above 50° C.

10. The apparatus of claim 1, wherein the apparatus is one or more of a battery, a capacitor, a supercapacitor, a battery-capacitor hybrid, an electronic device, a portable electronic device, a portable telecommunications device, a personal digital assistant, a mobile phone, a smartphone, a phablet, a tablet, a laptop computer, a desktop computer, a smartwatch, smart eyewear, an electronic watch, a wireless sensor, an electrochemical sensor, a wearable device, an RFID tag, an electrochromic device, a humidity sensor and a module for one or more of the same.

11. An apparatus comprising two or more of the apparatus of claim 1 arranged in a stack.

12. A method of making an apparatus, comprising
providing graphene oxide on a first charge collector, the graphene oxide configured to generate protons in the presence of water,
providing a second conductive material spaced apart from the first charge collector, the second material having a lower work function than the first charge collector,
the graphene oxide provided so as to extend from the first charge collector to be in contact with the second material at an interface; and
providing an ionic layer in contact with the graphene oxide and the second material, the ionic layer configured to absorb water from the surrounding environment to deliver said water to the apparatus, wherein the ionic layer comprises a room temperature ionic fluid and a solidifying material which provides for the ionic layer to be a solid at room temperature.

13. The method of claim 12, wherein providing the ionic layer comprises polymerising a cross-linkable oligomer in the presence of the room-temperature ionic fluid to form a covalent polymeric network containing the room-temperature ionic fluid.

14. The method of claim 13, wherein polymerising the cross-linkable oligomer in the presence of a room-temperature ionic fluid comprises UV irradiation of the room temperature ionic fluid, the cross-linkable oligomer and a UV cross-linking initiator material.

15. The method of claim 14, wherein the weight ratio between the room temperature ionic fluid, the cross-linkable oligomer and the UV cross-linking initiator is one of: 85:10:5, 80:15:5 or 75:20:5.

* * * * *